United States Patent Office 3,257,370
Patented June 21, 1966

3,257,370
PROCESS FOR POLYMERIZING ALPHA-OLEFINS
Giulio Natta, Paolo Longi, Giorgio Mazzanti, and Arnaldo Roggero, Milan, Italy, assignors to Montecatini Societa Generale per l'Industria Mineraria e Chimica, a corporation of Italy
No Drawing. Filed Jan. 26, 1962, Ser. No. 169,142
Claims priority, application Italy, Jan. 30, 1961, 1,524/61
24 Claims. (Cl. 260—93.7)

The present invention relates to a particular process for polymerizing alpha-olefins to high molecular weight linear polymers which, when fractionated by successive extraction with boiling solvents, such as ether, hexane and heptane, show the presence of a regular syndiotactic structure in all the fractions composed of crystallizable macromolecules.

It is known that an alpha-olefin such as propylene can be polymerized with the aid of catalysts containing metallorganic compounds and transition metal compounds. The polymers thus obtained, when fractionated by extraction with boiling solvents, show the presence of syndiotactic structure only in the hexane extract and this structure is not noted in the macromolecules of the other polymer extracts.

Applicants have now surprisingly found that, by using particular catalytic systems, it is possible to obtain high molecular weight linear polymers of alpha-olefins, which when solvent fractionated are demonstrated to have the syndiotactic structure present in all the fractions composed of crystallizable macromolecules.

The catalytic systems, which according to the present invention are capable of promoting said polymerization comprise (A) a metallorganic compound of sodium and (B) an addition complex of titanium tetrachloride or tetrabromide with particular Lewis organic bases.

An object of the present invention is therefore to provide a process for polymerizing alpha-olefins of the type R—CH=$CH_2$, wherein R is a linear or branched alkyl group containing 1 to 4 carbon atoms, to high molecular weight linear polymers which, when extracted in order with solvents such as boiling ether, hexane and heptane, are demonstrated to have present a regular syndiotactic structure in all the fractions composed of crystallizable macromolecules.

A further object of the present invention is to provide a catalyst system for promoting this polymerization.

An additional object is to provide alpha-olefin polymers possessing the regular syndiotactic structure in the crystallizable polymer fractions.

Other objects and advantages of the present invention will become apparent from the following further description and examples.

Alpha-olefins which are particularly suitable for the polymerization according to the present invention are propylene, butene-1 and methylpentene.

The polymerization process, which is an object of the present invention, is carried out in the presence of a catalytic system containing (A) an organic compound of sodium and (B) a compound of the type $TiX_4$ (in which X is chlorine or bromine) complexed with an organic base, according to the Lewis concept, such as compounds of the formula:

R'YR"

wherein R' and R" are equal or different alkyl groups, alkene groups such as vinyl, substituted or unsubstituted aryl, cycloaryl or alkylaryl groups, and Y is an oxygen or sulfur atom; or complexed with compounds such as substituted or unsubstituted ketones, amides or hydrazines.

Some non-limiting illustrations of compounds which, according to the present invention, can be used with success as complexing agents for the $TiX_4$ compound are: diisopropylether, ethylvinylether, isopropylvinylether, hexadecylvinylether, anisole, diphenyl ether, diphenyl sulfide, acetone, methylethylketone, acetophenone, benzophenone, methylacetamide, phenylacetamide, acetanilide, phenylhydrazine, asymmetric or symmetric diphenylhydrazine, etc.

The presence of the organic base as a complexing agent for titanium tetrachloride or tetrabromide is essential for the obtaining of the aforementioned alpha-olefin polymers.

The use of complexing agents also makes it possible to increase considerably the amount of polymer produced, since the catalyst thereby maintains a high activity for a considerable time (at least 6 to 8 hours).

The complexing agents can be used in amounts corresponding to complexant/titanium tetrahalide molar ratios betwen 0.25 and 30, or preferably between 1 and 4.

As sodium organic compounds, which may be used according to the present invention, butyl sodium, amyl sodium, octyl sodium, nonyl sodium, decyl sodium, undecyl sodium or dodecyl sodium may be mentioned. Thus, in general, organic compounds containing up to 12 carbon atoms are preferably used.

Upon using, for example, catalysts prepared from n-octyl sodium and from the addition complex of anisol with titanium tetrabromide while carrying out the polymerization at a temperature between —80° and —40° C., propylene polymers are obtained which, by extraction in order with boiling ether, hexane and heptane, give the following: (A) an hexane extract which, upon X-ray examination is demonstrated to have only a crystallinity of syndiotactic type, the crystallinity derived from the isotactic structure being absent, (B) a heptane extract having crystallinity of both the isotactic and syndiotactic type in comparable amounts and (C) a residue after heptane extraction which exhibits both the types of crystallinity, the isotactic structure being the prevailing one.

The ether extract of this polymer in general, in addition to a prevailingly (more than 50%) portion of amorphous polymer, also contains macromolecules possessing the syndiotactic structure.

By operating under the same conditions but using, instead of the addition complex of anisol with titanium tetrabromide, the addition complex of $TiBr_4$ with dimethyl ether, diethylether or tetrahydrofurane (i.e. compounds not included within the scope of the present invention), polymers exhibiting the syndiotactic structure only in the hexane extract are obtained. In the fractions extractable with heptane only traces of syndiotactic structure are present while the extraction residue is completely free from macromolecules possessing this structure.

Furthermore, if addition complexes of titanium tetrabromide or tetrachloride with other Lewis organic bases, which possess a higher complexing power, such as, e.g., certain nitrogen bases such as pyridine or trimethyl amine, are used in the preparation of the catalyst, catalytic systems are obtained which possess a very low activity in the polymerization of propylene and the polymer obtained is practically free of macromolecules having the syndiotactic structure.

The polymerization process of the present invention can be carried out using a broad temperature range, generally between —100° and +50° C., preferably between —80° and +20° C.

Applicants have also found that, upon using the catalysts of the present invention, the proportion of macromolecules having the syndiotactic structure in the total polymer produced, increases by decreasing the polymerization temperature.

The activity of the catalytic systems used in the process of the present invention depends on the molar ratio between compound A and complex B which form the catalytic system.

Thus, as exemplified in Example 5, upon using catalysts prepared from compound A (n-octyl sodium) and complex B (titanium tetrachloride diisopropyletherate), the highest catalytic activities are obtained with molar ratios of compound A to complex B between 6 and 8.

While the catalytic activity is highly influenced by the value of this ratio, the results of the fractionation by extraction with boiling solvents and the intrinsic viscosities of the polymers obtained do not vary significantly, at least when catalyst ratios between 2 and 10 are employed.

As was stated above, the polymers of the present invention are particularly rich in macromolecules having a syndiotactic structure.

An index of the amount of molecules possessing the syndiotactic structure, which are present in a given polymer fraction, can be obtained by infrared spectrographic examination. The results of this examination taken as a ratio, multiplied per 100, between the optical density of the absorption at $11.5\mu$ and the optical density of the absorption at $3.64\mu$ are values proportional to the percentages of syndiotactic structure present in the samples examined.

By using this method, for example, in case of a propylene polymer prepared under the typical conditions of the process according to the present invention (see Example 1), the following index numbers were found:

| | Percent |
|---|---|
| Ether extract | 3 |
| Hexane extract | 30 |
| Heptane extract | 28 |
| Residue insoluble in heptane | 13 |

By carrying out the polymerization using the same catalytic systems, prepared from sodium metallorganic compounds and titanium tetrachloride or tetrabromide, but upon operating in the absence of the particular complexing agents of the present invention, propylene polymers are produced which possess a lower proportion of the syndiotactic structure and wherein this structure is demonstrated to be present only in the hexane extract fraction of these polymers. Upon determining the index of syndiotactic structure, according to the method described above, for this polymer or for fractions obtained therefrom, much lower values are found.

The alpha-olefin polymers, obtained according to the present invention, are suitable for the production of films, fibers, manufactured articles, molded articles, etc. In general, they are suitable for use in all fields in which polymers having thermoplastic properties are used.

The following examples are given to illustrate the present invention without limiting its scope.

All percentages are by weight unless otherwise indicated.

The intrinsic viscosities of the polymer fractions are measured in tetrahydronaphthalene at 135° C., unless otherwise indicated.

EXAMPLE 1

2.48 g. (0.0182 mol) of n-octyl sodium suspended in 200 cc. of anhydrous heptane are introduced under nitrogen into a 750 cc. four-necked flask provided with an agitator, dropping funnel and a pipe for introducing gaseous propylene. The flask is cooled to −78° C. and gaseous propylene is then introduced in an amount up to 200 g. while maintaining agitation.

In the dropping funnel a solution of a $TiBr_4$-anisol complex is prepared by adding 1.67 g. of $TiBr_4$ and 0.492 g. of anhydrous anisol to 50 cc. of anhydrous heptane. The clear solution thus obtained, which has an orange-yellow color, is then quickly added to the contents of the flask.

After stirring for 10 hours at the temperature of −78° C., 50 cc. of methanol are added, the non-polymerized propylene is removed by evaporation and the polymerization product is completely coagulated with methanol. After repeated washing with methanol and drying, a rubbery white mass amounting to 15 g. is obtained.

Upon extraction with boiling solvents the following fractions are obtained:

(1) An ether extract (17.2% of the total polymer) composed of polypropylene having a prevailingly (more than 50%) atactic structure. A crystallinity of syndiotactic type is however also observed upon X-ray examination. The percent ratio for this fraction, determined by infrared spectrography, between the optical density of the absorption band at $11.53\mu$ and that at $3.65\mu$ is 3%. The intrinsic viscosity is 1.1.

(2) A hexane extract (10.4% of the total polymer) which by X-ray examination, is demonstrated to have only a crystallinity of syndiotactic type. The value of the ratio between the optical densities of the two infrared absorption bands at $11.53\mu$ and at $3.65\mu$, is 30%. The intrinsic viscosity is 2.7.

(3) A n-heptane extract (21% of the total polymer) composed of macromolecules exhibiting an isotactic structure which are prevailingly in the form of stereo-blocks. Polypropylene having syndiotactic structure is also present. The crystallinities of the syndiotactic and isotactic type, determined by X-ray examination, appear to be present in comparable amounts. The ratio between the optical densities of the two infrared absorption bands at $11.53\mu$ and at $3.56\mu$, has a value of 28%. The intrinsic viscosity of this fraction is 4.1.

(4) A residue after heptane extraction (51.4% of the total polymer) which, by X-ray examination is demonstrated to have a crystallinity (about 40%) of the isotactic type. A crystallinity of syndiotactic type is also clearly observed. The percent ratio between the optical densities of the two infrared absorption bands at $11.53\mu$ and at $3.65\mu$ has a value of 13% for this fraction. The intrinsic viscosity is 3.8.

EXAMPLE 2

2.48 g. of n-octyl sodium suspended in 200 cc. of anhydrous n-heptane, and 50 cc. of a heptane solution of a $TiBr_4$-etherate, obtained from 1.67 g. of $TiBr_4$ and 0.492 g. of anisol are introduced under nitrogen into a 1-liter stainless steel oscillating autoclave. 200 g. of propylene are then added and the mixture is agitated for 8 hours at the temperature of 20 C. After having removed all the unreacted propylene, the reaction mass is discharged, coagulated and the catalyst removed therefrom by repeated treatments with methanol. After drying, 120 g. of a white rubbery mass having an intrinsic viscosity of 5.1 are obtained.

By extraction with boiling solvents the polymer is shown to be composed of:

(1) 34.4% of an ether extract composed of polypropylene having macromolecules of the atactic structure, and no crystallinity due to the isotactic structure.

(2) 6.8% of an n-heptane extract which, by X-ray examination is demonstrated to have a crystallinity of the isotactic and syndiotactic type, in generally equal amounts. The crystallinity of isotactic type is, at least prevailingly (more than 50%), due to the presence of stereoblock macromolecules.

(3) 54.0% of polypropylene insoluble in boiling heptane, possessing a crystallinity of isotactic type (about 40%). A crystallinity of syndiotactic type is also clearly observed in this fraction.

EXAMPLE 3

Example 2 is repeated, but in this case 0.865 g. of $TiCl_4$ are used instead of 1.67 g. of $TiBr_4$.

180 g. of polypropylene having an intrinsic viscosity of 4.5 are obtained. By extraction with boiling solvents the polymer gives the following fractions:

(1) An ether extract (28.1%) composed of polypropylene having a prevailingly (more than 50%) atactic structure. A small amount of crystallinity of syndiotactic type is also observed by X-ray examination. The ratio (multiplied by 100) between the optical densities of the two infrared absorption bands at 11.53μ and at 3.65μ is 2%. The intrinsic viscosity is 2.8.

(2) A hexane extract (4%) which, by X-ray examination, is demonstrated to have only a crystallinity of the syndiotactic type. The value of the ratio between the infrared absorption bands is 25%. The intrinsic viscosity is 5.5%.

(3) A n-heptane extract (8.7%) which shows a crystallinity attributable to the presence of the isotactic and syndiotactic structures, the syndiotactic structure being present in prevaling (more than 50%) proportions. The value of the ratio between the optical densities of the two infrared absorption bands, for this fraction is 21%. The intrinsic viscosity is 4.9.

(4) A n-octane extract (44.5%) which, upon X-ray examination is demonstrated to possess a crystallinity of both the isotactic and syndiotactic type, the isotactic type being the prevailing structure. The ratio between the optical densities of the two infrared absorption bands at 11.53μ and 3.65μ is 16%. The intrinsic viscosity is 4.0.

(5) A residue after heptane extraction (14.7%) which possesses a crystalline content of 60%. This crystallinity is attributable to the isotactic structure. A syndiotactic type of crystallinity is also observed. The ratio between the optical densities of the two infrared absorption bands at 11.53μ and 3.65μ is 7%. The intrinsic viscosity is 4.1.

EXAMPLE 4

2.48 (0.0182 mol) of n-octyl sodium suspended in 200 cc. of n-heptane and 150 g. of propylene are introduced into the apparatus described in Example 1. During this period, in the dropping funnel, 0.465 g. of anhydrous diisopropyl ether are added to a solution of 0.865 g. of $TiCl_4$ in 50 cc. of n-heptane. There then takes place the formation of a finely divided lemon-yellow precipitate. The heptane suspension thus obtained is added to the content of the flask while agitating.

By proceeding as described in Example 1, 7 g. of polypropylene having an intrinsic viscosity of 3.8 are isolated. The extraction with boiling solvents gives the following results:

(1) 19.8% of an ether extract, composed of amorphous polypropylene.

(2) 5.3% of an n-pentane extract, which possesses crystallinity only of the syndiotactic type.

(3) 10.1% of an n-hexane extract, having a high crystallinity of syndiotactic type, the crystallinity of isotactic type being absent.

(4) 7.6% of n-heptane extract which is demonstrated to have a crystallinity of the syndiotactic and of the isotactic type, the isotactic type of crystallinity being in prevailing proportions (more than 50%).

(5) A residue (57.2%) of the heptane extraction, which is shown to be crystalline to the extent of about 40%, this crystallinity being of isotactic type. A slight crystallinity of syndiotactic type is also observed.

EXAMPLE 5

Polymerization runs are carried out with propylene using the catalytic system obtained from n-octyl sodium and the $TiCl_4$-diisopropyl ether complex. In each run the n-octyl Na/$TiCl_4$-diisopropyl ether molar ratio is varied by varying the amount of n-octyl Na used and the amount of $TiCl_4$-etherate is kept constant (0.865 g. of $TiCl_4$ and 0.465 g. of isopropyl ether). All the runs are carried out according to the procedure described in Example 2.

In Table 1 are reported the amounts and the intrinsic viscosities of the polypropylenes obtained in these runs.

*Table 1*

| Ratio, mols n-octyl Na to mols $TiCl_4$-diisopropylether | Polymer obtained, g. | Intrinsic viscosity |
| --- | --- | --- |
| 1 | 0 | |
| 2.5 | 46 | 6.0 |
| 3 | 54 | 6.1 |
| 4 | 76 | 5.9 |
| 6 | 110 | 5.4 |
| 8 | 96 | 5.8 |
| 11 | 59 | 6.5 |

The fractionation by extraction with boiling solvents of the various polypropylenes obtained with different Na/Ti ratios, does not give significantly different results. By way of example, the following are the results produced upon the fractionation of polypropylene obtained with the aid of the catalytic system $$Na\ n\text{-}octyl + TiCl_4 \cdot O(C_3H_7)_2$$

wherein the molar ratio of sodium salt to the complex is 4:

(1) 24.8% of an ether extract, composed of amorphous polypropylene.

(2) 2% of a n-hexane extract, exhibiting a high crystallinity of the syndiotactic type, a crystallinity attributable to the isotactic structure being absent.

(3) 7.5% of a n-heptane extract having both a crystallinity of syndiotactic and isotactic type, in generally equal amounts. The proportion of syndiotactic crystallinity determined from the ratio between the optical densities of the two infrared absorption bands at 11.53 and at 3.65μ, is 17%.

(4) 65.7% of a residue after heptane extraction, exhibiting a crystallinity of isotactic type. This crystallinity amounts to about 40% of the whole fraction. A crystallinity of syndiotactic type is also observed; present in a proportion, determined by infrared spectrography as mentioned above, of 7%. The melting temperature of this fraction, determined under the polarizing microscope, is 162° C.

EXAMPLE 6

2.48 g. of n-octyl sodium suspended in 200 cc. of anhydrous n-heptane and a benzene suspension of the $TiCl_4$-$CH_3CONHC_6H_5$ complex (obtained from 0.863 g. of $TiCl_4$ and 0.62 g. of acetanilide in 50 cc. of anhydrous benzene) are introduced under nitrogen into a 1-liter oscillating autoclave. 200 g. of propylene are then added and the whole is agitated at the temperature of 20° C. for 15 hours. The polymer, purified as described in Example 1, amounts to 50 g. and has an intrinsic viscosity of 5.6. The fractionation, by extraction with boiling solvents, gives the following results:

(1) An ether extract, corresponding to 27.2% of the total polymer product, composed of a polypropylene which is shown to be amorphous by X-ray examination.

(2) A hexane extract, corresponding to 4.2% of the total polymer, which upon X-ray examination, presents a high crystallinity of the syndiotactic type.

(3) A heptane extract, corresponding to 8.5% of the total polymer, which exhibits a crystallinity of syndiotactic and isotactic type. The crystallinity of syndiotactic type however is present in considerably higher proportions than that of isotactic type.

(4) A polypropylene residue which is insoluble in boiling heptane, corresponding to 60.1% of the total polymer. This fraction is demonstrated to be crystalline in a proportion of about 40%. This crystallinity is of isotactic and syndiotactic type, the isotactic type being prevailing (more than 50%).

EXAMPLE 7

The procedure followed is the same as that of Example 6, but in this case 0.33 g. of methyl ethyl ketone are used as the complexing agent and, as the solvent for preparing the suspension of the $TiCl_4$-$CH_3COCH_2H_5$ complex, 50 cc. of n-heptane are employed.

15 g. of polypropylene are obtained after 10 hours at the temperature of 20° C. The intrinsic viscosity is 6. The following fractions are obtained by extraction with boiling solvents:

(1) An ether extract (18.3%) composed of polypropylene which is demonstrated to be amorphous upon X-ray examination.

(2) A hexane extract (7.8%) having a high crystallinity of the syndiotactic type, the crystallinity attributable to the isotactic structure being absent.

(3) A heptane extract (5.1%) having a crystallinity of the isotactic and syndiotactic type, in comparable (generally equal) amounts.

(4) A residue after heptane extraction (68.8%) having a crystallinity (of about 40%) of the isotactic type and a lower amount of a crystallinity of syndiotactic type.

EXAMPLE 8

The procedure followed is the same as that of Example 6, but 0.49 g. of phenylhydrazine ($C_6H_5NH$-$NH_2$) are used as the complexing agent.

30 g. of polypropylene having an intrinsic viscosity of 4.4 are obtained. The fractionation gives the following results:

(1) An ether extract (41.2%) composed of polypropylene having the atactic structure.

(2) A hexane extract (2.5%) presenting a high crystallinity of only the syndiotactic type.

(3) A heptane extract (16.0%) presenting a crystallinity of isotactic and syndiotactic type, in comparable amounts.

(4) A residue after heptane extraction (40.3%) which has a crystallinity of the isotactic type (about 40% of the total fraction) and a crystallinity of syndiotactic type, the latter being present in a lower amount.

EXAMPLE 9

By proceeding as in Example 8, but using 0.84 g. of $(C_6H_5)_2NNH_2$, 21 g. of polypropylene are obtained. Upon fractionation with boiling solvents the polymer gives:

(1) 26.7% of ether extract, composed of amorphous polypropylene.

(2) 12.0% of hexane extract containing a high crystallinity of the syndiotactic type.

(3) 6.0% of a heptane extract, which is demonstrated to have a crystallinity of isotactic and syndiotactic type, present in comparable (generally equal) amounts.

(4) 55.3% of residue after heptane extraction, which by X-ray examination, shows a crystallinity of the isotactic type and a crystallinity of the syndiotactic type, the latter being in a much lower amount.

EXAMPLE 10

The procedure of Example 3 is followed, but, as the alkyl sodium, n-butyl sodium (0.0182 mol) is used instead of n-octyl sodium.

21 g. of polypropylene are obtained which, by solvent extraction give the following:

(1) 18% of amorphous polypropylene.

(2) 7% of a hexane extract which, by X-ray examination, shows a crystallinity of only the syndiotactic type.

(3) 10.2% of a heptane extract exhibiting a crystallinity of the isotactic type and a crystallinity of syndiotactic type, the latter being in a much lower amount.

(4) 64.8% of residue from the heptane extraction exhibiting a crystallinity of the isotactic type and a weak crystallinity of syndiotactic type.

EXAMPLE 11

By proceeding as in Example 3, but using 1.21 g. (0.00455 mol) of hexadecyl vinyl ether, instead of 0.492 g. of anisole, 90 g. of polypropylene having an intrinsic viscosity of 5.7 are obtained. By extraction with boiling solvents said polymer gives the following results:

(1) 39.7% of an ether extract.
(2) 15.8% of a hexane extract.
(3) 8.5% of a n-heptane extract.
(4) 36.0% of a polymer residue which is nonextractable with boiling heptane.

The characteristics of each of these fractions are the same as those already mentioned for the corresponding fractions disclosed in Example 4.

EXAMPLE 12

In this example, the vinyl ether employed as complexing agent for $TiCl_4$, before the preparation of the catalyst, is isopropylvinyl ether (0.39 g. corresponding to 0.00455 mol). 80 g. of propylene having an intrinsic viscosity of 4.7 are obtained. Extraction with boiling solvents gives the following results:

(1) 32.7% of an ether extract.
(2) 5.3% of a hexane extract.
(3) 11.4% of a n-heptane extract.
(4) 50.6% of a polymer which is non-extractable with boiling heptane. The characteristics of each fraction are the same as those disclosed for the corresponding fractions of Example 4.

EXAMPLE 13

In this example the complexing agent for the $TiCl_4$ is ethylvinyl ether (0.33 g. corresponding to 0.00455 mol of ethyl vinyl ether). 85 g. of polypropylene having an intrinsic viscosity of 5.3 are obtained.

EXAMPLE 14

The polymerization is carried out as in Example 3 but in this case cyclohexyl sodium (2.9 g.; 0.027 mol) is used instead of n-octyl sodium.

42 g. of polypropylene having an intrinsic viscosity of 4.8 are obtained.

By extraction with boiling solvents it gave the following fractions:

(1) 32.5% of ether extract.
(2) 16.2% of hexane extract.
(3) 7.3% of n-heptane extract.
(4) 44.0% of polymer non-extractable with boiling n-heptane.

The characteristics of the single fraction are very similar to those of the corresponding fractions described in Example 4.

The ether used as the extracting solvent in the above examples is ethyl ether.

Many variations and modifications can, of course, be practiced without departing from the scope of the present invention.

Having thus described the present invention, what it is desired to secure and claim by Letters Patent is:

1. A process for producing high molecular weight linear propylene polymers which, upon fractionation by successive extraction with ethyl ether, hexane and heptane at their boiling temperatures, show the presence of a regular syndiotactic structure in all the fractions containing crystallizable macromolecules, which process comprises polymerizing propylene at a temperature between −100° and +50° C. in contact with a catalyst system obtained from (A) an alkyl compound of sodium and (B) a compound of formula $TiX_4$, wherein X is selected from the group consisting of chlorine and bromine atoms, complexed with a Lewis organic base selected from the group consisting of diisopropylether, ethylvinylether, isopropylvinylether, hexadecylvinylether, anisole, diphenylether, diphenyl sulfide, acetone, methylethylketone, acetophenone, benzophenone, methylacetamide, phenylacetamide, acetanilide, phenylhydrazine, asymmetric diphenylhydrazine, and symmetrical diphenylhydrazine.

2. The polymerization process according to claim 1, wherein the molar ratio between said components (A) and (B) in the catalytic system is between about 2 and about 8.

3. The polymerization process according to claim 2, wherein said molar ratio in the catalytic system is between 6 and 8.

4. The polymerization process according to claim 1, wherein the molar ratio between the Lewis organic base and $TiX_4$ in said component (B) is between 0.25 and 30.

5. The polymerization process according to claim 4, wherein said molar ratio is between 1 and 4.

6. The polymerization process according to claim 1, which is carried out at a temperature between $-80°$ and $+20°$ C.

7. The polymerization process according to claim 1, which is carried out in a solvent which is inert with respect to the catalyst.

8. The polymerization process according to claim 7, wherein a hydrocarbon compound is used as the solvent.

9. The polymerization process according to claim 8, wherein n-heptane is used as the hydrocarbon.

10. The polymeriaztion process according to claim 1, wherein anisol is used as the Lewis organic base.

11. The polymerization process according to claim 1, wherein diisopropyl ether is used as the Lewis organic base.

12. The polymerization process according to claim 1, wherein an alkylalkenylether is used as the Lewis organic base.

13. The polymerization process according to claim 12, wherein ethylvinylether is used as the Lewis organic base.

14. The polymerization process according to claim 12, wherein isopropylvinylether is used as the Lewis organic base.

15. The polymerization process according to claim 12, wherein hexadecylvinylether is used as the Lewis organic base.

16. The polymerization process according to claim 1, wherein methylethylketone is used as the Lewis organic base.

17. The polymerization process according to claim 1, wherein phenylhydrazine is used as the Lewis organic base.

18. The polymerization process according to claim 1, wherein phenylacetamide is used as the Lewis organic base.

19. The polymerization process according to claim 1, wherein diphenylhydrazine is used as the Lewis organic base.

20. The polymerization process according to claim 1, wherein the alkyl sodium compound contains up to 12 carbon atoms.

21. The polymerization process according to claim 20, wherein n-octyl sodium is used.

22. The polymerization process according to claim 20, wherein n-butyl sodium is used.

23. The process according to claim 1, wherein the Lewis base is anisole and the alkyl sodium compound is n-octyl sodium.

24. The process according to claim 1, wherein the Lewis base is anisole and the alkyl sodium compound is n-butyl sodium.

References Cited by the Examiner

UNITED STATES PATENTS

| | | | |
|---|---|---|---|
| 2,881,156 | 4/1959 | Pilar | 260—94.9 |
| 2,956,991 | 10/1960 | Coover et al. | 260—93.7 |

FOREIGN PATENTS 809,717   3/1959   Great Britain.

OTHER REFERENCES

Natta, Scientific American, vol. 197, No. 3, September 1957 (pp. 98–104) pp. 98–104 needed only.

JOSEPH L. SCHOFER, *Primary Examiner.*

JAMES A. SEIDLECK, *Examiner.*